Feb. 21, 1956 R. S. HINSEY 2,735,311
MECHANISM CONTROL
Filed Feb. 16, 1951 2 Sheets-Sheet 2
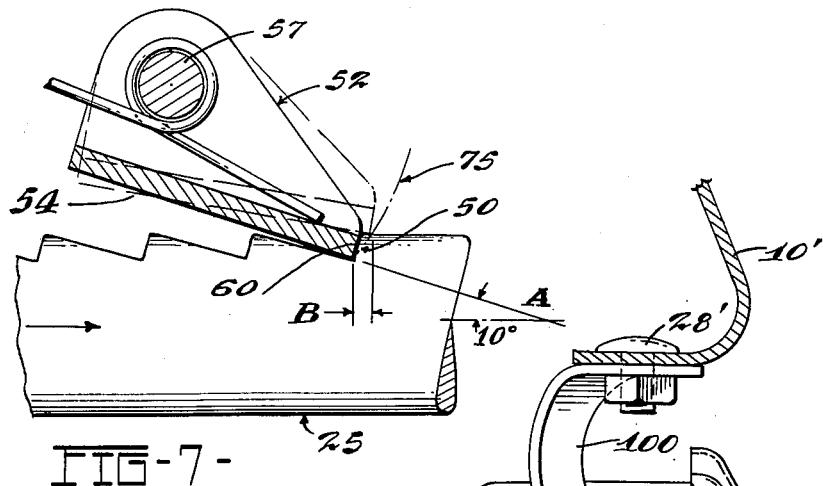
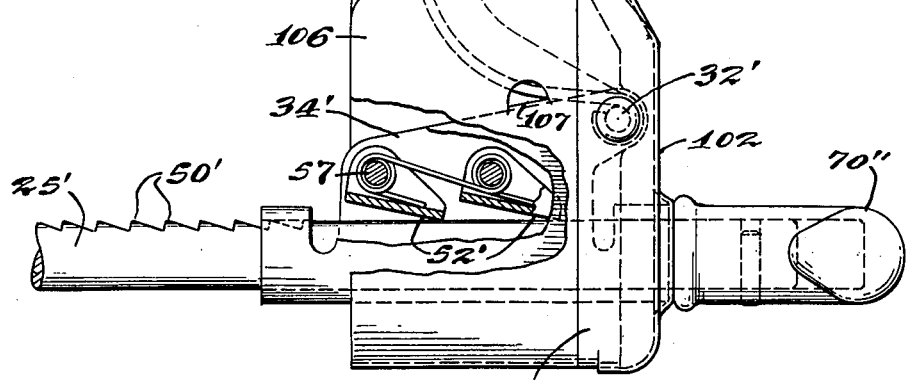
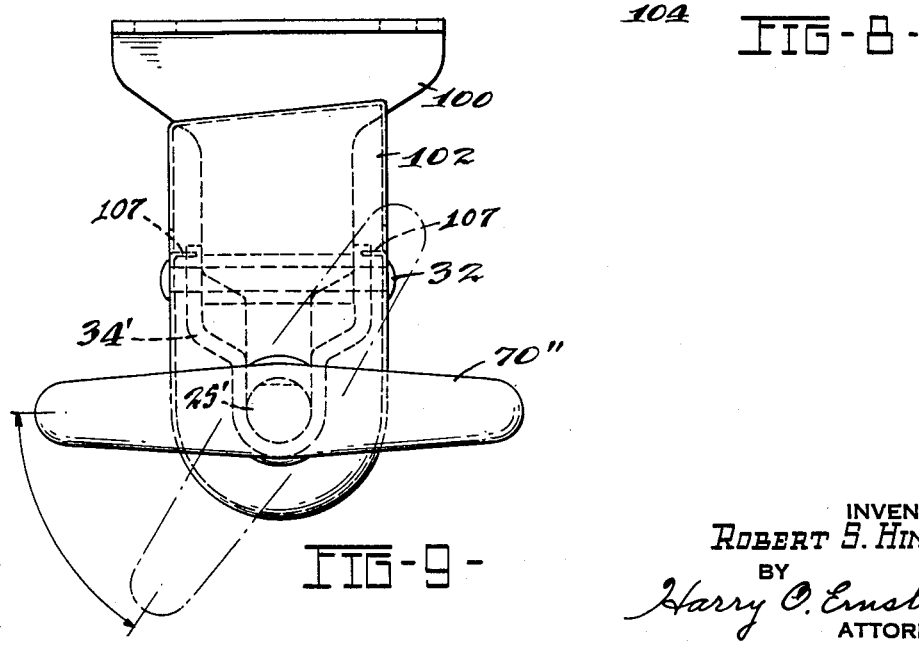
INVENTOR:
ROBERT S. HINSEY.
BY
Harry O. Ernsberger
ATTORNEY × # United States Patent Office 2,735,311
Patented Feb. 21, 1956

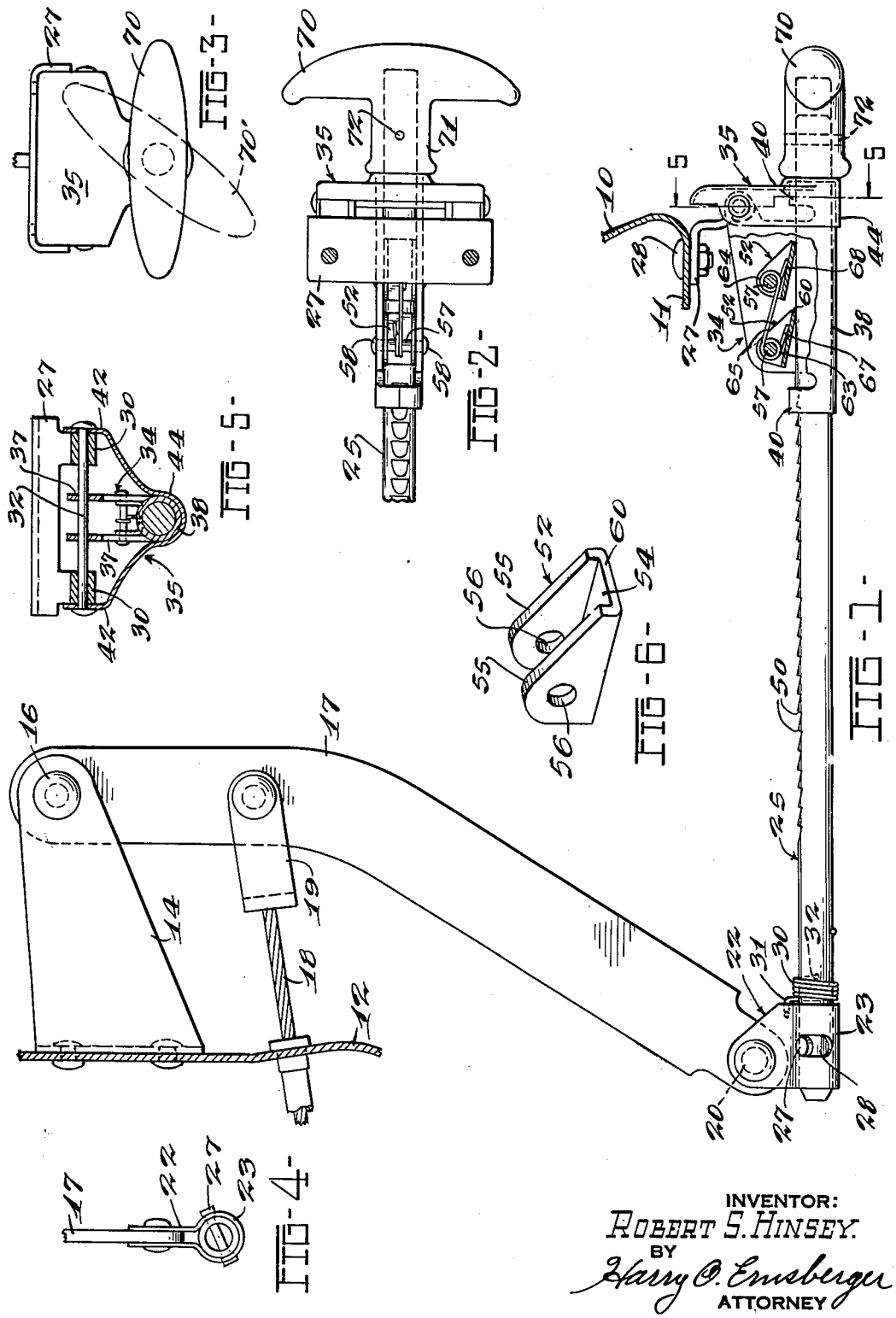

2,735,311

MECHANISM CONTROL

Robert S. Hinsey, Toledo, Ohio, assignor to The Bingham-Herbrand Corporation, Toledo, Ohio, a corporation of Ohio Application February 16, 1951, Serial No. 211,398

4 Claims. (Cl. 74—502)

This invention relates to mechanism control and more especially to apparatus for actuating or controlling the brake mechanism of vehicles and more specifically the parking or emergency brakes.

The invention comprehends a mechanism control incorporating a member constructed and supported for movement in a longitudinal direction for actuating mechanism connected thereto in combination with a pawl type clutch means for retaining the member in longitudinally adjusted position and wherein the member is arranged for relative movement in another direction for effecting release of the clutch means.

An object of the invention is the provision of mechanism especially adaptable for actuating and controlling the parking or emergency brakes of a vehicle, the arrangement embodying a bar or member movable in a direction of its length cooperating with a plurality of pivoted pawls or clutch members whereby a relatively fine adjustment of the position of the bar may be attained to effectively secure the vehicle brake mechanism in "set" position.

Another object of the invention resides in the provision of a bar movable in a direction of its length for setting the brakes of a vehicle, the bar cooperating with a pawl means, the interengagement of the pawl means with a serrated formation on the bar being of a character requiring rotational movement of the bar and additional lengthwise movement thereof toward brake setting position in order to effect a disengagement of the pawl means with the serrated formation on the bar.

A further object of the invention resides in the provision of an apparatus for manipulating brakes of a vehicle wherein a member is arranged for longitudinal movement to set the brakes and is adapted for relative rotation to release the brakes and wherein the bar retaining means is arranged so as to require an appreciable rotative force applied to the bar before release of the bar may be effected so as to minimize the liability of inadvertent or accidental release of the brake mechanism.

Another object of the invention resides in the provision of actuating and controlling means for vehicle brakes of a hand operated character and wherein such mechanism requires an application of force in a particular direction to effect release of the mechanism whereby the brakes may only be released through the deliberate application of a properly directed force so as to minimize the liability of release of the brake mechanism by children.

A further object of the invention resides in a serrated bar and pawl mechanism for actuating or controlling vehicle brakes wherein the pawl means is formed of channel-shaped configuration and pivotally supported in a manner to minimize friction, the channel configuration providing a reinforcement for the region of the pawl adapted for engagement with the serrated portion of the bar whereby this portion of the pawl may be locally heat treated and hardened to present a wearing surface having extremely long life yet avoiding characteristic brittleness where the entire pawl is hardened augmenting the liability of fracture of the pawl means.

A further object is the provision of a compact and unitary brake actuating means consisting of few elements or components, a major number of which may be fashioned from sheet metal enhancing the interchangeability of the elements as well as to effect economies in manufacture and assembly.

Still a further object of the invention resides in the provision of a plurality of pivotally supported pawls functioning as clutch means to hold a longitudinally movable brake actuating bar or member in adjusted position, the arrangement embodying a single resilient means for continuously biasing the pawls into engagement with the bar or member whereby the resilient means serves as a lost motion take-up means constantly impressing a force effective against the pawls and bar providing for the elimination of noise and rattles which might otherwise be set up by reason of vibration of the vehicle in which the mechanism may be incorporated.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view showing one form of mechanism control of my invention utilized as a brake actuating and controlling means, certain parts being shown in section for purposes of illustration;

Figure 2 is a top plan view illustrating a portion of the mechanism shown in Figure 1;

Figure 3 is an end elevational view illustrating the manipulating means for the mechanism controlling member;

Figure 4 is a view of the opposite end of a portion of the mechanism illustrated in Figure 1;

Figure 5 is a vertical transverse sectional view taken substantially on the line 5—5 of Figure 1;

Figure 6 is an isometric view of one of the pawl elements forming part of the invention;

Figure 7 is an enlarged view illustrating the additional longitudinal movement of the brake manipulating bar occurring during disengagement of the pawl with a clutching surface on the bar;

Figure 8 is an elevational view showing a modified form of mounting and enclosure for a portion of the mechanism; and Figure 9 is an end elevational view of the structure illustrated in Figure 8.

While the mechanism control of the invention is illustrated as particularly adapted for actuating and controlling the parking or emergency brakes of an automotive vehicle, it is to be understood that I contemplate the utilization of the invention for controlling any mechanism wherein the arrangement may be found to have utility.

Referring to the drawings in detail, and first with respect to the arrangement shown in Figures 1 through 6, the embodiment of the invention is illustrated as adaptable for mounting adjacent the operator's compartment of a vehicle, the instrument panel thereof being illustrated at 10 and forms a supporting means for the brake actuating mechanism. Spaced from the instrument panel is a dashboard 12 of the vehicle to which is secured a bracket 14. Pivotally supported upon the bracket by means of a pin or gudgeon 16 is a depending lever 17. A flexible cable 18 or the like is pivotally connected to the lever 17 by means of a clevis 19 and is adapted for connection with a vehicle brake mechanism (not shown) or other apparatus to be controlled. The lever 17 is provided at its lower end with a stub shaft or rivet 20 to which is pivotally connected a sheet metal clip or bracket 22 having a cylindrical portion 23 which substantially embraces the extremity of a brake actuating bar or member 25.

The bar or member 25 is connected to the clip 22 in a manner to provide for limited relative rotational movement of the bar with respect to the clip. The connecting means is inclusive of a pin 27 which extends through an opening in the bar 25. The opposed wall portions of the clip 22 are formed with elongated slots 28 to accommodate the ends of the pin 27. It will be apparent that the bar 25 may be rotated through a radial angle limited by the length of the slots 28. A torsion spring 30 is disposed adjacent the clip 22 and has one end 31 anchored in an opening in the clip 22 while the other end 32 of the spring is anchored in an opening in the bar 25. The spring 30 functions to normally bias the bar 25 in one direction of rotation, the end walls of the slots 28 serving to fix or determine the limit of rotation of the bar under the influence of the spring.

An important feature of the present invention resides in the provision of a simple yet effective means cooperating with the member 25 for retaining the brakes of a vehicle or other mechanism with which the arrangement may be connected in an adjusted position. This is accomplished through the cooperation of one or more pawl elements of a particular configuration with spaced teeth or abutments formed on the manipulating member 25.

The arrangement for supporting the pawl elements and the manipulating rod 25 is preferably carried by the instrument panel 10. To this end there is secured to a flange 11 of the instrument panel a bracket 27 suitably secured to the flange by means of bolts 28 or other suitable securing means. The bracket 27 is formed with spaced downwardly extending portions which are rolled or formed into eyes or cylindrical configurations indicated at 30. The cylindrical portions 30 of the bracket 27 are adapted to accommodate a pin or shaft 32 which is adapted to pivotally support a U-shaped housing or casing 34 and an escutcheon 35.

The upwardly extending parallel wall portions 37 of the housing 34 are joined by a semicylindrically shaped bight portion 38, the latter being arranged to slidably receive and accommodate the manipulating rod or bar 25. The housing 34 is also provided adjacent each end with lip portions 40 which are formed into curved configuration providing, with the bight portion 38 of the housing, annular guides slidably accommodating the manipulating bar 25.

The upper portions of the side walls 37 of the housing 34 are formed with aligned openings to accommodate the pin or shaft 32 as shown in Figure 5. The escutcheon 35 is formed with projecting portions 42 having openings therein through which the shaft 32 extends in the manner illustrated in Figure 5. The escutcheon 35 is formed with a semicylindrical portion 44 arranged for overlapping engagement with the bight portion 38 of the housing 34 in the manner shown in Figure 1, the portion 44 being spot welded or otherwise secured to the housing 34 so that both the housing and escutcheon 35 are hingedly or pivotally connected with the supporting bracket 27 for pivotal movement about the axis of the shaft 32.

The manipulating bar or member 25 in the embodiment illustrated is of circular cross-section as shown in Figure 5 and of a solid bar construction. It is to be understood that, if desired, a hollow or tubular member may be used in lieu of a solid bar or rod. The member 25 is provided with a plurality of slots or serrations forming a series of spaced teeth or abutments 50 which are arranged or aligned longitudinally along the member 25 as shown in Figure 1.

The extremities of the pivotally supported pawl elements are adapted for cooperation with the teeth or abutments 50 formed on the manipulating member 25. As illustrated in Figure 1, the embodiment of the invention disclosed includes two pawl elements designated 52, one of which is shown in isometric at Figure 6. As particularly shown in Figures 1, 6 and 7, each pawl element is of U-shaped or channel-shaped configuration having a base or bight portion 54 and sidewalls 55. The sidewalls of each pawl element are provided with aligned openings 56 adapted to accommodate pivot shafts or pins 57 as shown in Figure 1.

The shafts 57 which pivotally support the pawls extend through openings in the side walls 37 of the housing 35, the ends of the pins 57 being swaged to form head portions 58 for securing the pins to the housing 35. As shown in Figure 1, the pawls are supported upon the housing in a manner whereby they are spaced lengthwise of the manipulating member 25 and the forward faces 60 are arranged to engage the abutments or teeth 50 on the manipulating member 25 to hold the manipulating member, and hence the brakes or other mechanism with which the lever 17 may be connected, in brake set or adjusted position.

The pawl elements 52 are mounted in a manner whereby the forward tooth-engaging faces 60 of the base portions are spaced longitudinally so that they consecutively engage with the teeth 50, the spacing being such that when the face 60 of one pawl engages an abutment 50 on the member 25, the face of the other pawl is disposed intermediate two abutments on the member 25. By this means a fine adjustment of the position of the manipulating member 25 may be accomplished as one of the pawls 52 is always in a position to immediately engage with the nearest abutment or tooth 50 on the bar.

The pawl elements 52 are continuously biased or urged in a direction toward the member 25 under the influence of resilient means. In the embodiment illustrated the resilient means may be fashioned as a unit arranged to concomitantly influence both pawls in a direction for engagement with the bar 25. As shown in Figure 1, such spring means may be fashioned with a pair of spaced loops 63 and 64 connected by an intermediate portion 65, the loops 63 and 64 respectively encircling the pins 57 forming pivotal supports for the pawls 52. The respective ends 67 and 68 of the resilient means engage the bight or body portion 54 of each pawl 52 whereby the pawls are biased or urged into engagement with the bar or member 25.

The U-shaped or channelled configuration of the pawl members 52 provides a construction which is exceptionally strong and sturdy and which facilitates the local heat treatment and hardening of the region of the face or forward portions 60 of the pawls so as to impart long wearing qualities to such portions minimizing the liability of fracture of the hardened tooth engaging portions of the pawls.

Means is provided for manually actuating the bar of member 25 for moving the bar longitudinally to effect a setting of the brake mechanism with which the arrangement may be connected and for rotating the member 25 to effect a release or disengagement of the pawl elements with the teeth 50 of the member. Mounted upon a projecting portion of member 25 adjacent the escutcheon 35 is a handle 70 having a boss portion 71 bored to accommodate the forward end of the bar 25. A pin or dowel 72 may be driven through aligned openings in the boss 71 and the bar 25 as shown in Figure 2 for securing the handle to the bar. The handle 70 may be made of any suitable material as for example metal, die cast alloy, thermoplastic or thermosetting resinous material, or the like.

As shown in Figure 3 the handle 70 may be rotated in a counter-clockwise direction to the position indicated in broken lines in Figure 3 which movement causes corresponding rotation of the manipulating bar or member 25 about its longitudinal axis whereby an unserrated or smooth portion or surface of the member 25 is brought into alignment with the pawls 52, the serrated or toothed portion of the member 25 being moved out of engagement with the pawls. This partial rotation of the handle 70 and member 25 is permitted by the clearance slots 28 in the bracket 22 adjacent the pin 27, the pin 27 engaging the extremities of the slots in bracket 22 defining the limits of relative rotation of the member 25.

The spring 30 is tensioned or biased in a direction to normally and resiliently urge the handle 70 to the full line position as shown in Figure 3 so that when the manipulating bar or member 25 is moved longitudinally by an operator grasping the handle 70 and exerting forward longitudinal pull on the bar, the pawls 52 will be in position of alignment with the serrated portion of the member 25 to engage with the teeth or abutments 50 to retain the member 25 in longitudinally adjusted position.

Rotation of the handle 70 to the broken line position indicated at 70' in Figure 3 brings a smooth cylindrical exterior surface portion of member 25 in aligned position with the pawl elements 52 whereby reverse movement of the manipulating member 25 to its initial or brake release position may be accomplished as the surface of the bar may slide relative to the pawls without interruption of its return movement. When the operator releases the handle 70, the spring 30 automatically rotates the manipulating bar 25 to a position bringing the serrated portion in longitudinally aligned relation with the pawls 52.

Figure 7 illustrates in enlarged view the engagement of the face portion 60 of one of the pawl elements 52 with a tooth 50 formed on the member 25. From Figure 1 and the showing in Figure 7, it will be noticed that the pawl face 60 which is preferably fashioned at right angles to the base portion 54 is arranged at an angle of approximately ten degrees with respect to the axis of member 25. The pins 57 supporting the pawls are spaced a substantial distance from the bar or member 25. It should be noted that upon rotational movement of the member 25 by rotating the handle 70, the pawls 52 are moved out of engagement with the teeth 50 of the member 25, the lower forward edge of each pawl face 60 moves in an arc designated 75 in Figure 7 about the axis of pin 57 as a center.

Rotation of the member 25 in a direction to elevate the pawl from engagement with a tooth on the member forces the member 25 longitudinally in a righthand direction as viewed in Figures 1 and 7 a distance indicated at B in Figure 7. Thus in rotating the member 25, it is concomitantly moved further toward brake setting position and as the brake mechanism in "set" position exerts considerable longitudinal force on member 25 in a lefthand direction as viewed in Figures 1 and 7, an appreciable force is required applied to the handle 70 to rotate member 25.

This is a distinct advantage in that by providing the mechanism in a manner such that more than nominal effort is required to rotate the handle 70 before the pawl 52 is disengaged from a tooth in member 25, a means is thus provided to prevent inadvertent or accidental release of the mechanism by small children or by inadvertent contact of an object with the handle 70. This is a safety feature provided by the present invention which is particularly desirable when the arrangement is utilized for manipulating vehicle brakes.

The extent of longitudinal movement of member 25 indicated at B occurring during release of the pawls 52 may be changed by modifying the position of the pawl supporting pins 57 through their spacing laterally from the member 25 making more or less of an acute angle of the pawl faces with the axis of the member 25 which change in spacing will modify the amount of force required to rotate the member 25 in releasing the pawl and the extent of additional movement indicated at B during the release of the pawl means. If a lesser force is desired to release the pawl mechanism, the pins 57 supporting the pawls are disposed closer to the member 25; if greater force is desired to release the member 25, the pins 57 may be spaced a greater distance away from the member 25, the latter condition increasing the distance B through which the member 25 will be moved in a forward longitudinal direction before complete release of the pawls is effected.

Figures 8 and 9 illustrate a modified form of escutcheon and includes a closure or shield embracing the pawl housing 34'. The arrangement is carried by a member or support 100 secured to the instrument panel 10' by means of bolts 28'. The member 100 is formed with an eye adapted to receive a pivot pin or shaft 32' upon which is pivotally supported the pawl supporting housing 34'. The pawls 52' are adapted for cooperative relation with teeth or abutments 50' formed on the manipulating bar or member 25'.

A handle 70'' is secured upon the outer extremity of the member 25' for moving the bar longitudinally and for rotating same to effect release of the pawl members 52' from engagement with the teeth or abutments 50'. An escutcheon 102 has rearwardly extending wall portions 104 which are formed with aligned openings through which the shaft 32' extends so as to hold the escutcheon in predetermined relation to the pawl housing or bracket 34'.

In this form of construction a U-shaped sheet metal shroud or casing 106 is telescoped or arranged in overlapping relation with the walls of the escutcheon 102 forming an extension or enclosure for the pawl housing 34' and mechanism associated therewith. The shroud 106 is formed with inwardly extending ears 107 which engage the housing 34' to add further stabilizing means to position the shroud with respect to the bracket 34' and the escutcheon 102.

The operation of the form of the invention shown in Figures 8 and 9 is substantially the same as the form of the invention illustrated in Figures 1 through 7 inclusive. The brakes of a vehicle may be "set" by moving the bar 25' in a righthand direction as viewed in Figure 8, one of the pawls 52' engaging a tooth 50' to hold the bar in adjusted or "brake set" position. By rotating the handle 70'' to the position indicated in broken lines in Figure 9, the pawls 52' are elevated out of engagement with the teeth 50' whereby the pawls engage a smooth cylindrical exterior surface of the bar facilitating uninterrupted return movement of the bar to its initial or brake released position. The movement of the pawl 52' out of engagement with a tooth 50' upon rotation of handle 70'' causes the manipulating bar 25' to be moved an additional distance toward brake setting position in the manner illustrated in Figure 7.

It is apparent that, within the scope of the invention, modifications and different arrangements may be made other than is herein disclosed, and the present disclosure is illustrative merely, the invention comprehending all variations thereof.

What I claim is:

1. Mechanism control of the character disclosed, in combination, a support; a bracket associated with the support; a member adapted to be connected with mechanism to be controlled, said member being arranged for longitudinal and rotational movement relative to the support, said member having a plurality of teeth formed thereon, said bracket forming a guide for said member; a pair of channel-shaped pawls, each of said pawls having a planar bight portion and spaced upwardly extending parallel wall portions, said wall portions and adjacent portions of the bracket being formed with openings; shafts extending through said openings for pivotally supporting said pawls, said pawls being disposed whereby an edge surface of the planar portion of each pawl is disposed for cooperative engagement with the teeth on the member for retaining the latter in longitudinally adjusted position, and single spring means engageable with both of said pawls for biasing the pawls into engagement with the member, said member having an uninterrupted surface portion, said member being rotatable to a position wherein the pawls engage the uninterrupted surface to facilitate return movement of the member.

2. Mechanism for actuating the parking brakes of a vehicle including, in combination, a support; a U-shaped bracket secured to the support; a rod adapted to be connected to the brake mechanism to be controlled, said bracket having guide means formed thereon, said rod extending through said guide means and adapted for longitudinal and limited rotary movement relative to the bracket; a pair of longitudinally spaced shafts supported by the walls of the U-shaped bracket; a pair of channel-shaped pawls, each of said pawls having a planar bight portion and spaced parallel wall portions, said wall portions having openings through which the shafts extend whereby the pawls are pivotally supported upon said shafts, said rod being formed with a plurality of longitudinally spaced teeth, the forward edge surface zones of the planar portions of the pawls being hardened and adapted for engagement with the teeth to retain the rod in a longitudinally adjusted position, said rod being formed with an uninterrupted surface whereby rotation of the rod disengages the pawls from the teeth of the rod to facilitate longitudinal retractive movement of the rod, and a spring formed of spring wire having loop portions surrounding the shafts and end portions engageable with the pawls for normally biasing the pawls into engagement with the rod.

3. Mechanism control of the character disclosed, in combination, a bracket; an elongated member slidably engageable with the bracket, said elongated member being formed with a plurality of teeth in longitudinally aligned relation; a channel-shaped pawl member having a planar base portion and parallel leg portions; a pin carried by the bracket, said leg portions having openings above the plane of the base portion of the pawl to receive the pin for pivotally supporting the pawl, the edge wall of the base portion of the pawl being disposed at a right angle to the planar base, the zone of the pawl at the edge wall being hardened and arranged to engage the teeth on said member to retain the latter in longitudinally adjusted positions, said member being arranged for rotation relative to the pawl for disengaging the pawl from the teeth on the member, the axis of the pawl-supporting pin being spaced from the member whereby rotation of the member to release the pawl from engagement with the teeth causes further forward longitudinal movement of said member before release is effected.

4. Mechanism control of the character disclosed, in combination, a bracket; an elongated member slidably engageable with the bracket; said elongated member being formed with a plurality of teeth in longitudinally aligned relation; a channel-shaped pawl member having a planar base portion and substantially parallel leg portions; a pin carried by the bracket; said leg portions having openings above the plane of the base portion of the pawl to receive the pin for pivotally supporting the pawl, the edge wall of the base portion of the pawl being disposed substantially at a right angle to the planar base, the zone of the pawl at the edge wall being hardened and arranged to engage the teeth on said member to retain the latter in longitudinally adjusted positions, said member being arranged for rotation relative to the pawl for disengaging the pawl from the teeth on the member.

References Cited in the file of this patent

UNITED STATES PATENTS

| | | |
|---|---|---|
| 1,511,209 | Armstrong | Oct. 14, 1924 |
| 2,377,691 | Jandus | June 5, 1945 |
| 2,399,835 | Stoner | May 7, 1946 |
| 2,543,509 | Sandberg | Feb. 27, 1951 |
| 2,591,495 | Baldwin, Jr., et al. | Apr. 1, 1952 |
| 2,635,481 | De Orlow | Apr. 21, 1953 |
| 2,666,338 | Sandberg | Jan. 19, 1954 |